Aug. 29, 1933.   A. L. STEVENS   1,924,218
CONTINUOUS HEAT TREATING FURNACE
Filed Nov. 23, 1931   16 Sheets-Sheet 8

Inventor
Arthur L. Stevens,
By John E. Gardner Atty.

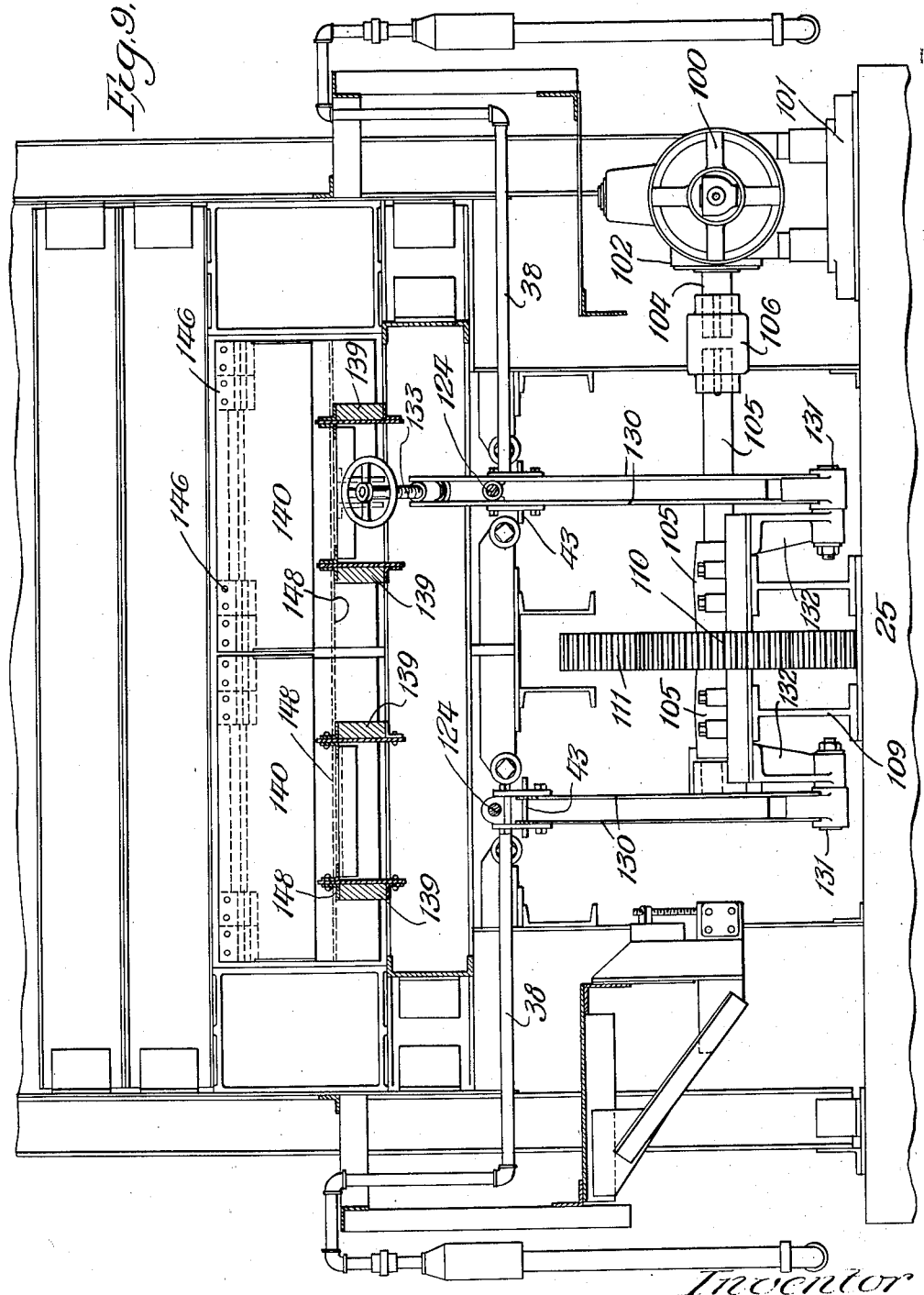

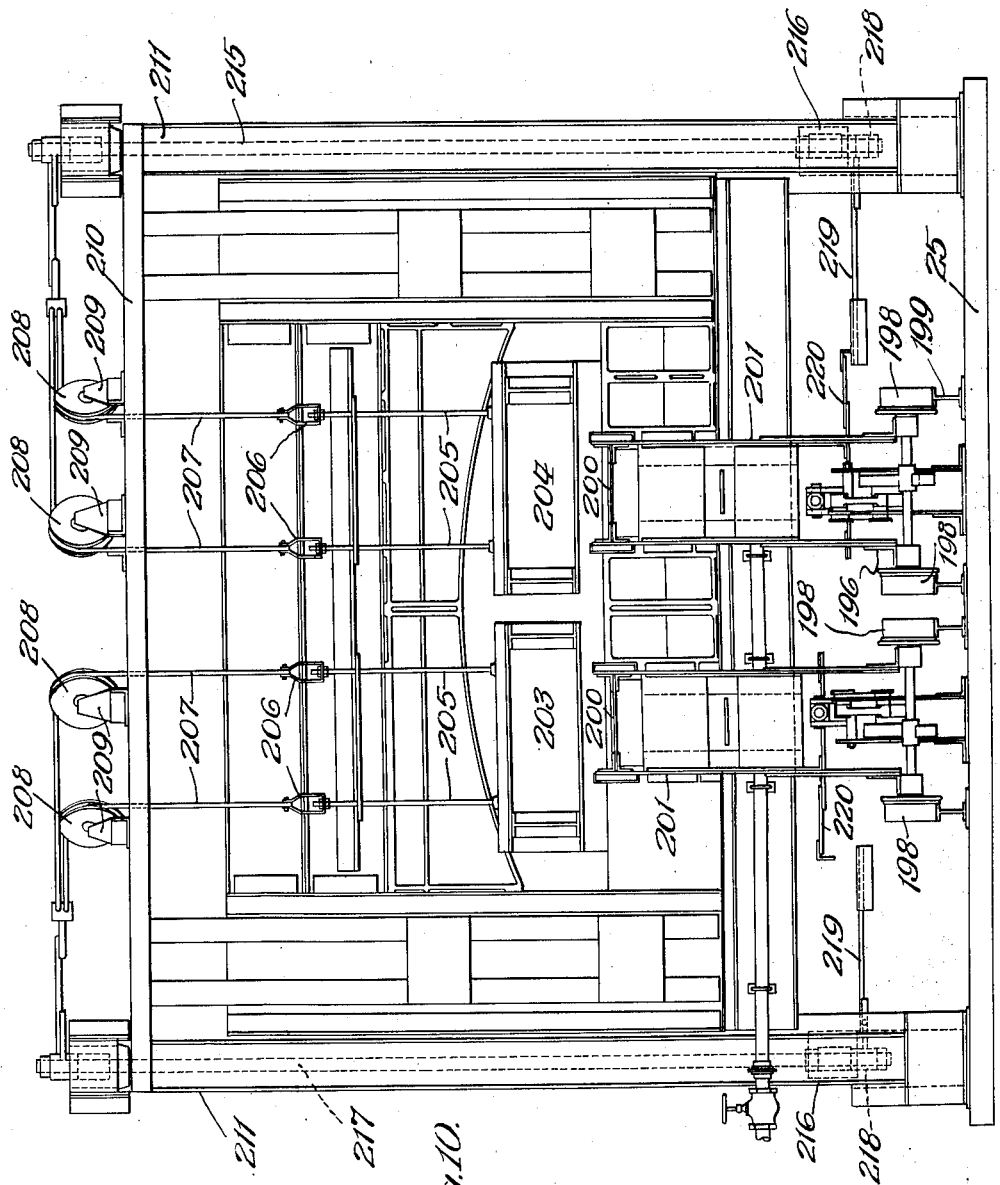

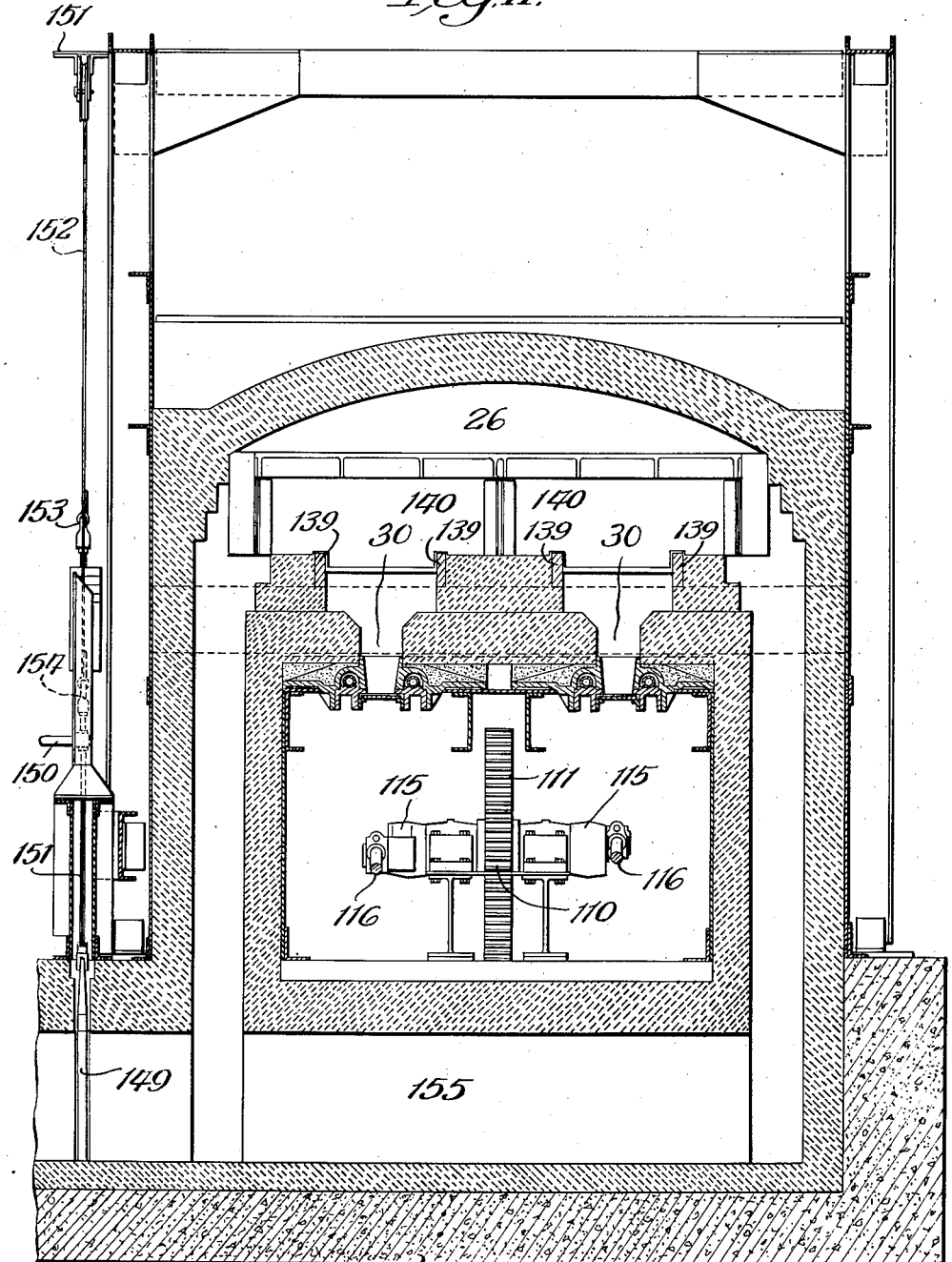

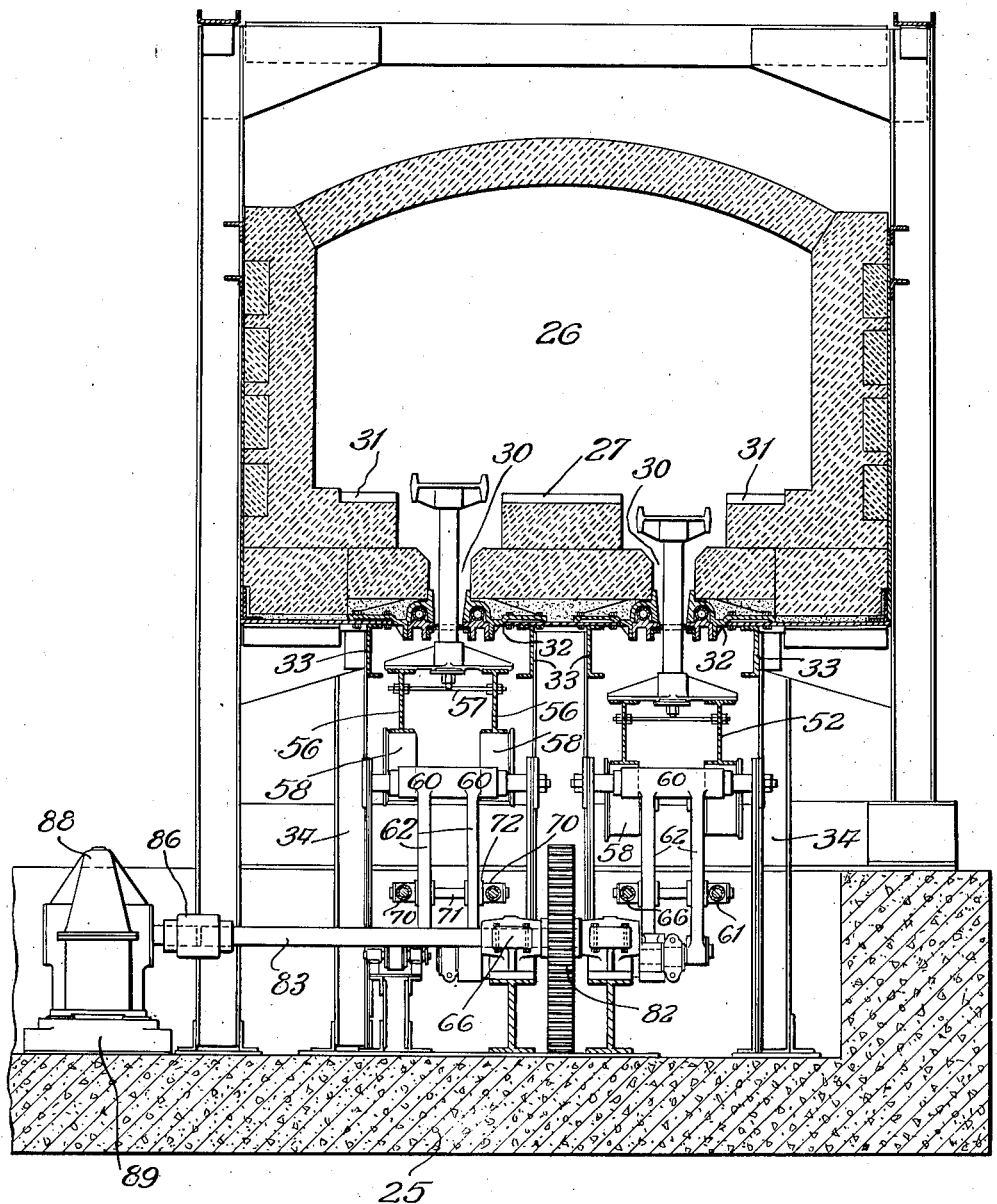

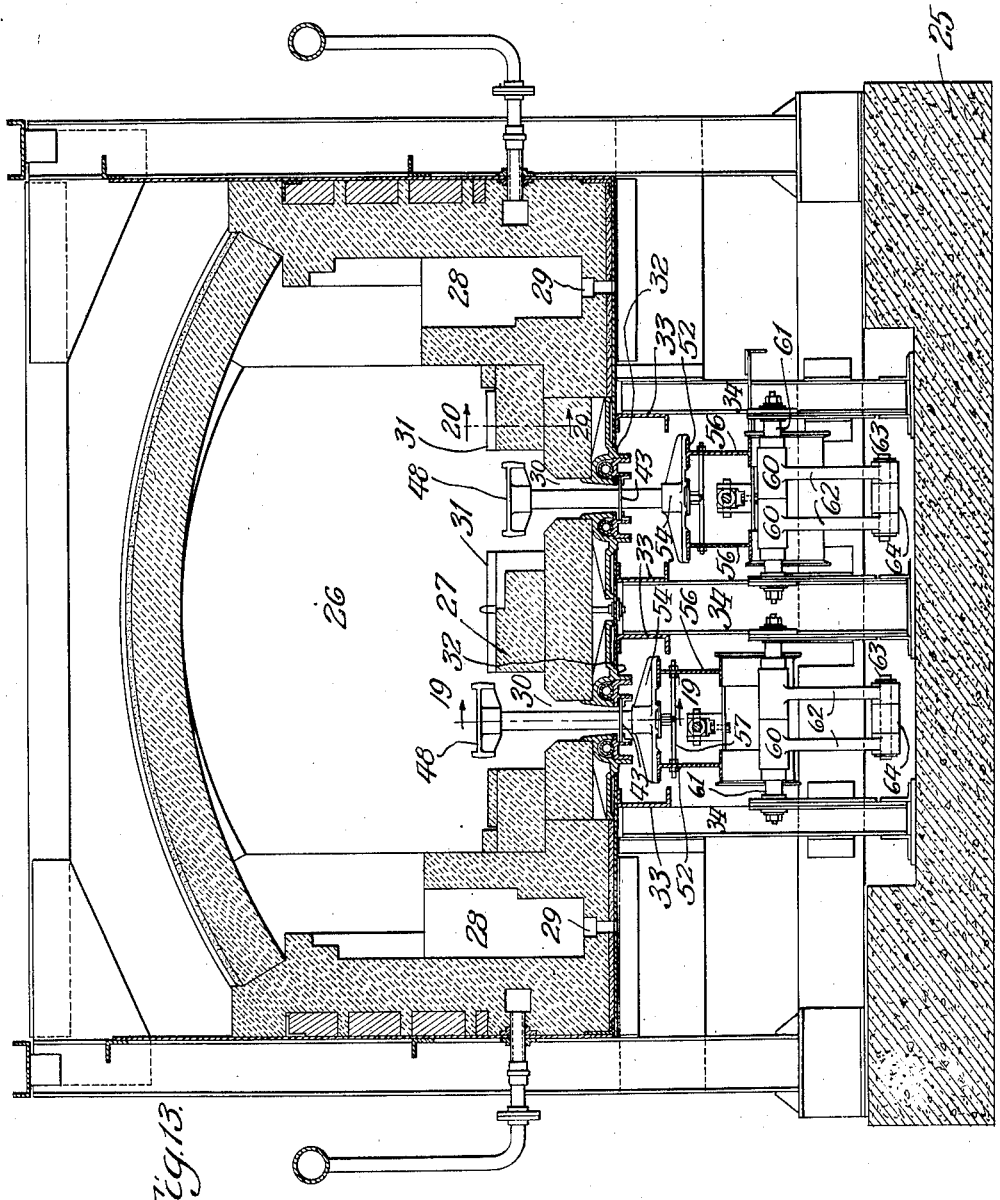

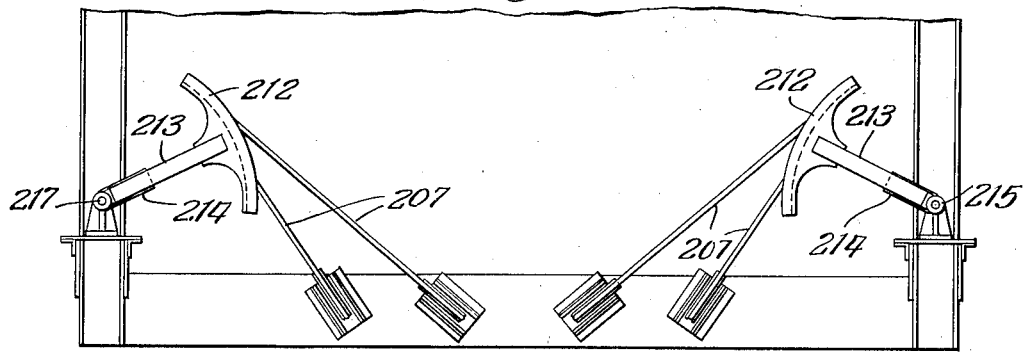
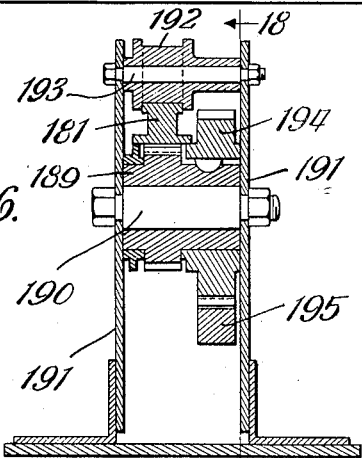
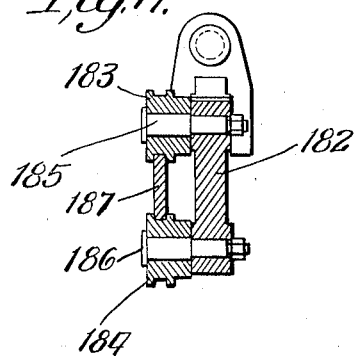
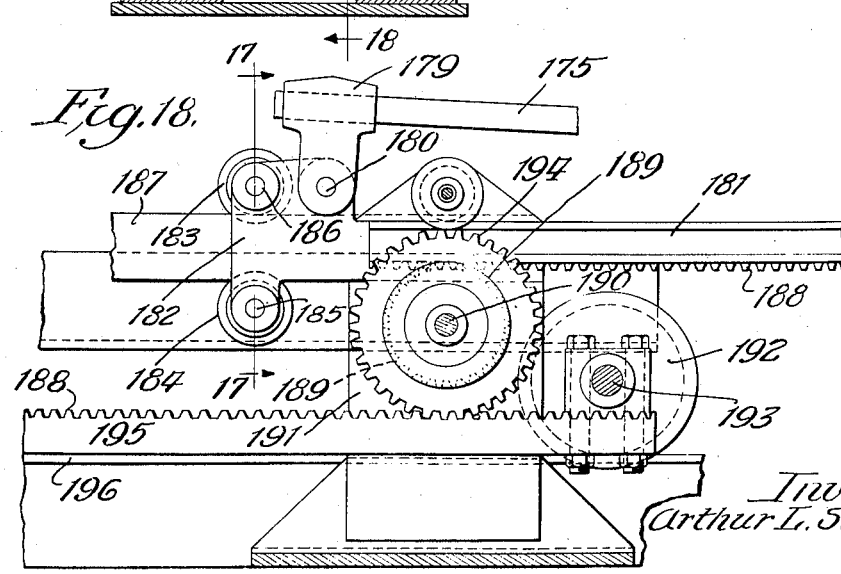

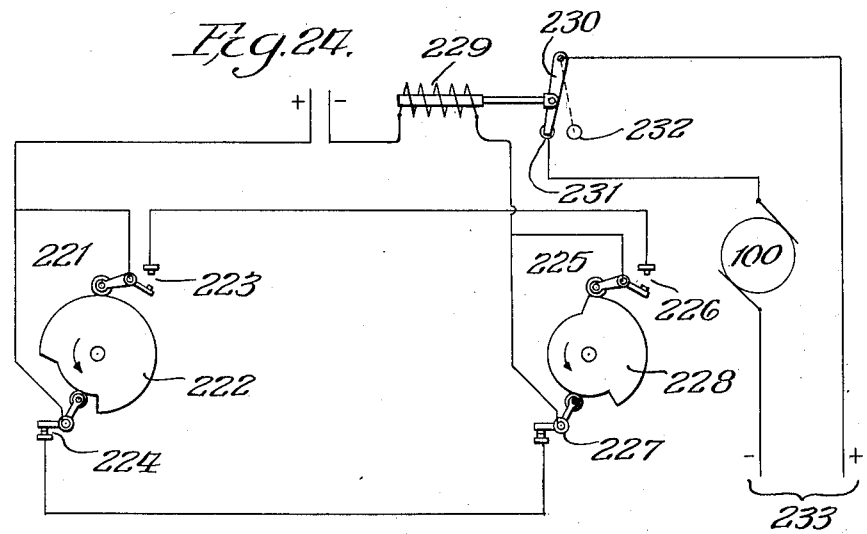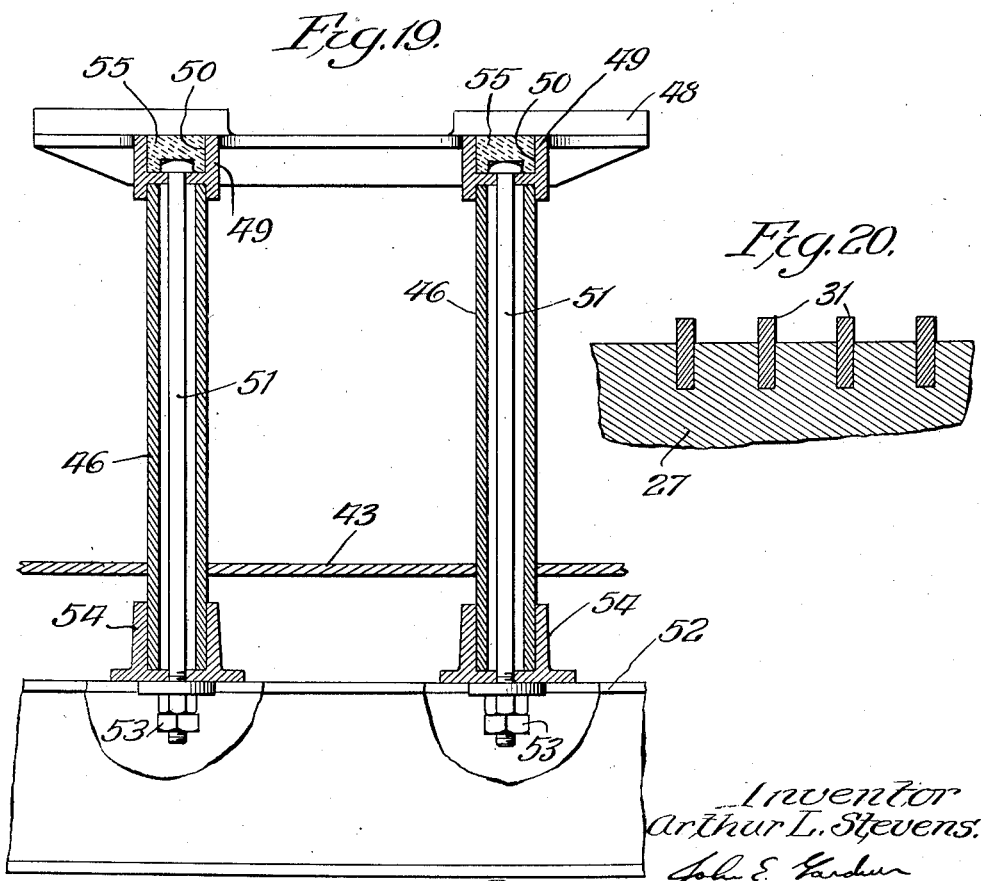

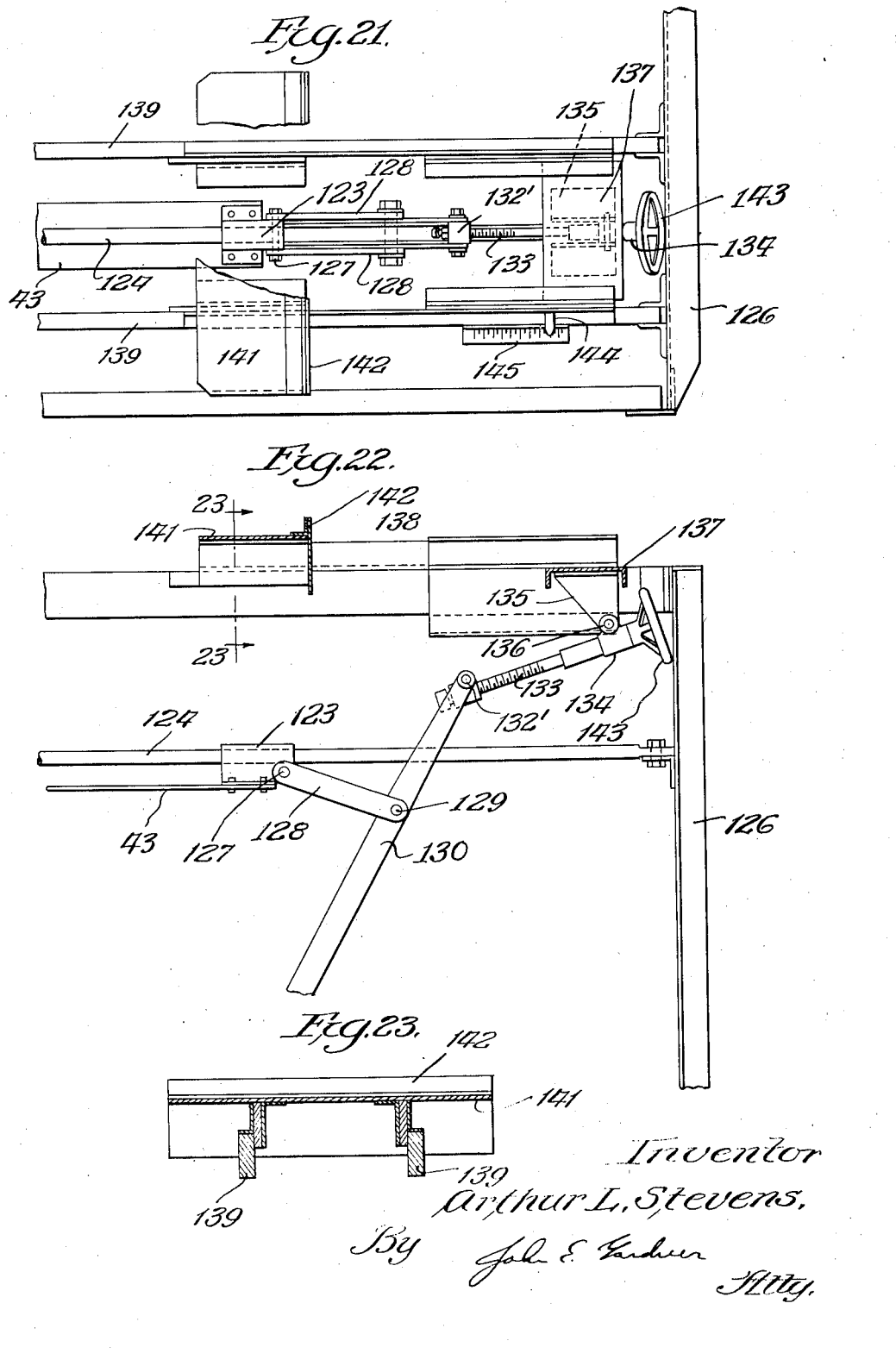

Patented Aug. 29, 1933

1,924,218

UNITED STATES PATENT OFFICE 1,924,218

CONTINUOUS HEAT TREATING FURNACE

Arthur L. Stevens, Evanston, Ill., assignor, by mesne assignments, to Arthur L. Stevens Corporation, Chicago, Ill., a Corporation of Delaware Application November 23, 1931
Serial No. 576,634

25 Claims. (Cl. 263—6)

The present invention relates in general to continuous heating furnaces and more particularly to such furnaces which are used in the heat treating of steel billets, plates, slabs, wheels or castings.

One of the objects of my invention is to provide movable means for positively moving the charges of material forward from one end of the furnace to the other.

Another object is to construct this means so as to be durable under the action of hot gases of the furnace.

Another object is to provide sealing means for preventing the escape of hot gases even during the operation of the moving mechanism.

Another object is to provide mechanism by which the moving of the charges of material may be accompanied by a small electric motor.

A further object is to provide means for armoring the brickwork of the hearth so as to increase the life of the furnace.

A further object is to provide cooling means for increasing the length of life of the brickwork and sealing means.

A further object is to provide means for adjusting the pusher rods at the charging end of the furnace so as to provide for varying sizes in the material charged.

A still further object is to provide mechanism for positively operating the doors automatically of the furnace.

Another object is to provide means by which the water cooling system as well as sealing means is rendered readily accessible to permit repairs thereof as well as rendering the interior of the furnace easily accessible for cleaning.

Stll another object is to provide a furnace of this character in which two charges of material may be fed into the furnace substantially simultaneously.

A still further object is to provide a special control circuit for operating the motors controlling the charging and feeding of the material into and through the furnace.

There are other objects of my invention which, together with the foregoing, will be described in the detailed specification that is to follow taken in conjunction with the accompanying drawings and forming a part thereof.

In practicing my invention, I provide a furnace in which the hearth is divided into at least three sections with two central openings extending the length thereof. A movable beam is mounted for movement directly below each opening and carries a plurality of lifting bars supporting cradles. These beams are movable lengthwise of the furnace and also are adapted to be raised. The lifting bars extend through openings in a sealing member that is slideably mounted in the hearth openings. The sealing members extend the full length of the furnace and project on either side thereof so as to maintain the hearth closed during the full movement of the beams carrying the lifting bars. I provide a pushing mechanism that is adapted to push the charges into the furnace at the charging end and peals or retrieving mechanism at the discharge end for removing the charges. The pushing mechanism, peals and beams are connected together mechanically so as to operate in a predetermined sequence. By this mechanism, the charges are charged cool into one end of the furnace and moved periodically forward gradually heated and discharged at the other end of the furnace. My furnace is, of course, provided with a plurality of combustion chambers which may be fed with oil or gas for heating the charges. By my improved construction, the charges are heated uniformly, so-called "cold spots" are avoided and my method of sealing gives better control of furnace atmosphere, prevents scaling of the heat treated charges and promotes fuel economy.

The drawings illustrate a typical adaptation of my invention to a continuous heat treating furnace.

Referring now to the drawings:

Fig. 9 is an end sectional elevation of the charging end of my improved furnace taken along the line 9—9 of Fig. 1 looking in the direction of the arrows;

Fig. 10 is a similar sectional elevation of the discharge end of my improved furnace taken along the line 10—10 of Fig. 2 looking in the direction of the arrows;

Fig. 11 is a cross sectional elevation of the furnace taken along the line 11—11 of Fig. 1.

Fig. 12 is a similar section taken along the line 12—12 of Fig. 7 looking in the direction of the arrows.

Fig. 13 is a similar section taken along the line 13—13 of Fig. 8 looking in the direction of the arrows;

Fig. 14 is a detailed section illustrating the water cooling and details of the sealing.

Fig. 15 is a fragmentary top plan of the discharge end of the furnace illustrating the door connections;

Fig. 16 is a detailed sectional elevation taken along the line 16—16 of Fig. 8 looking in the direction of the arrows;

Fig. 17 is another detailed section taken along the line 17—17 of Fig. 18 looking in the direction of the arrows;

Fig. 18 is a side elevation partly in section of the detail shown in Fig. 16 and taken along the line 18—18 thereof looking in the direction of the arrows;

Fig. 19 is a detailed section of two of the lifting bars taken along the line 19—19 of Fig. 13, looking in the direction of the arrows;

Fig. 20 is a fragmentary section of the hearth illustrating the armoring taken along the line 20—20 of Fig. 13 looking in the direction of the arrows;

Fig. 21 is an enlarged fragmentary plan of the charging carriage illustrated in the lower right-hand corner of Fig. 1.

Fig. 22 is a sectional elevation of the same.

Fig. 23 is a cross section taken along the line 23—23 of Fig. 22 looking in the direction of the arrows;

Fig. 24 is a schematic diagram of the electric control circuits employed for energizing the motor that brings about the horizontal progression of the charges through the furnace.

Like reference characters in the various sheets of drawings apply to similar parts throughout.

Figure 1:
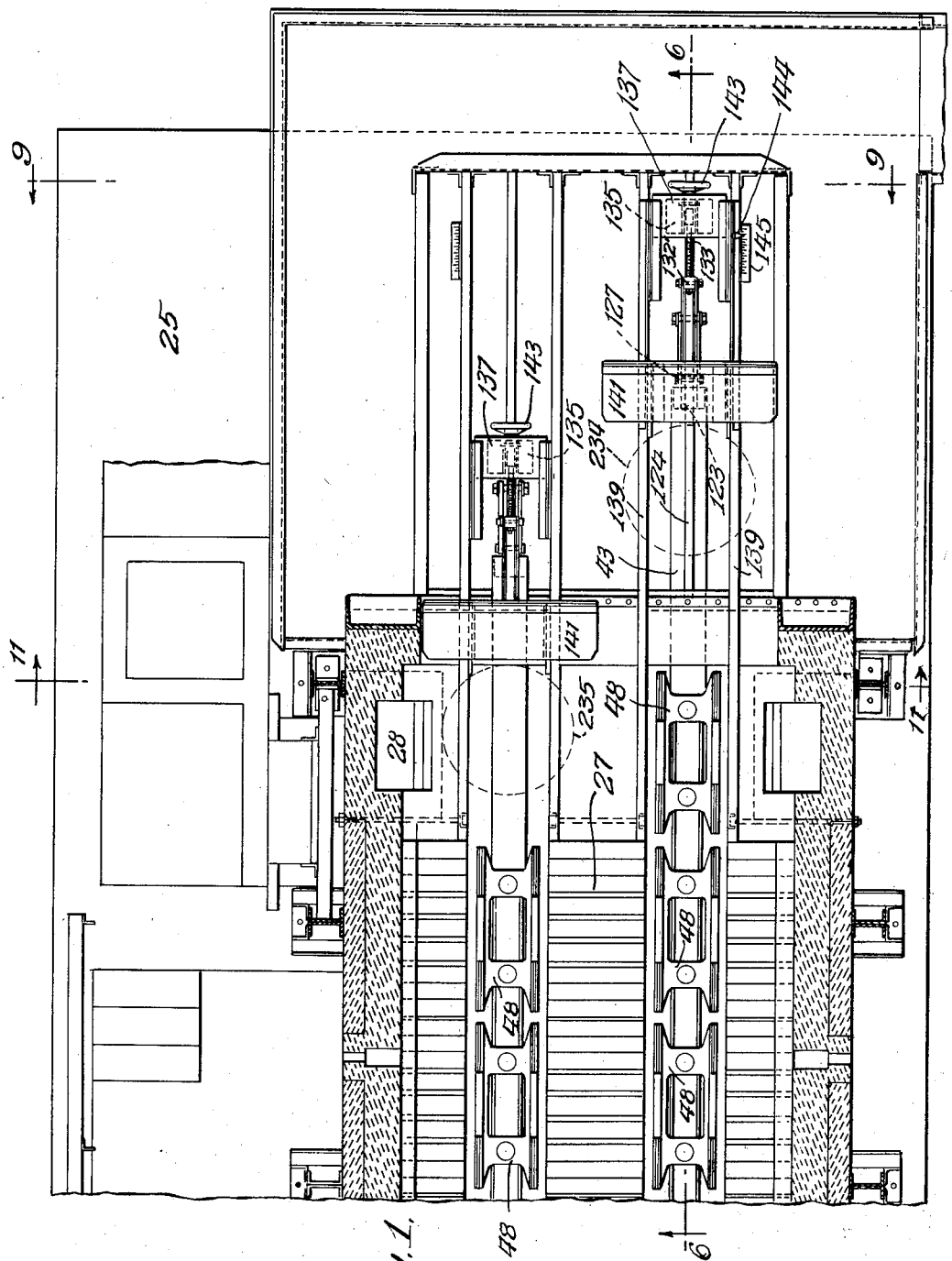
Fig. 1 is a cross section of the charging end of my improved furnace showing a top plan of the mechanism taken along the line 1—1 of Fig. 6 looking in the direction of the arrows.
Figure 2:
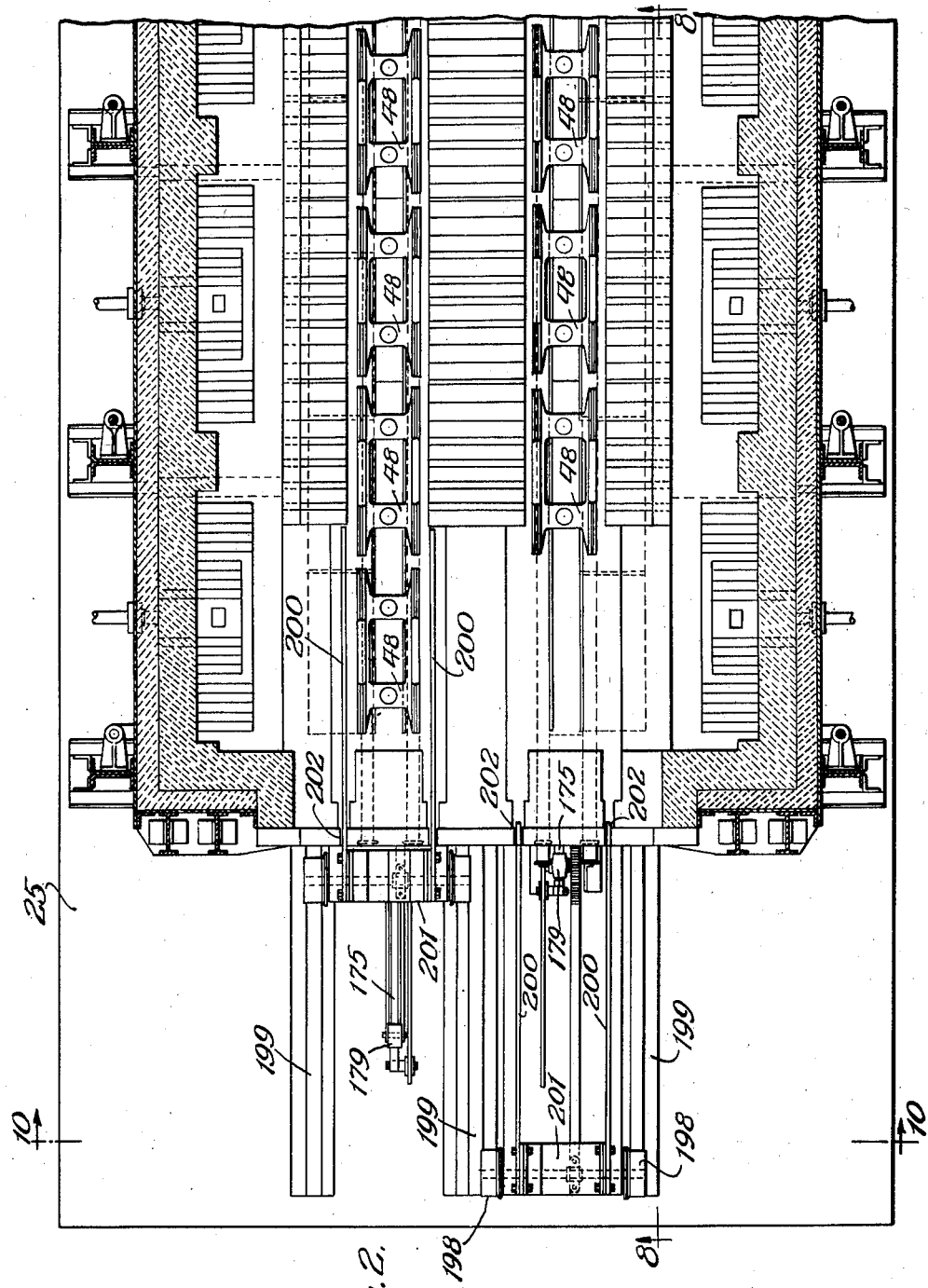
Fig. 2 is a similar view of the discharge end of my improved furnace taken along the line 2—2 of Fig. 8, looking in the direction of the arrows.

My improved open hearth furnace is generally constructed in a usual and well known manner, having steel structural shapes supported on a concrete foundation 25 and comprising essentially a heating chamber 26, a hearth 27 and combustion chambers 28 served by oil or gas burners through openings 29. It will be understood that there are a number of combustion chambers 28 throughout the length of the furnace containing suitable burners and provided with exhaust flues and dampers, according to well known practice. The hearth 27 is slotted the entire length of the furnace as at 30 dividing the hearth into three or more longitudinal sections.

The hearth itself is constructed of fire clay and is provided with upstanding spaced apart armoring members or grids 31 set in the fire clay and extending a short distance above it (see Fig. 20). These grids serve to protect the hearth itself from the charges passing through, since these charges are supported on the grids a short distance above the hearth itself. This greatly increases the life of the hearth. The charges are supported by the grids a short distance above the hearth itself permitting the heated air to reach the charges. These grids may be composed of alloy or calorized steel to enable them to withstand the heat of the furnace.

The hearth sections 27 are supported on base castings 32 (Figs. 12 and 13) which rest upon hearth beams 33 which are in turn supported by columns 34 attached to the concrete foundation 25. The base castings 32 extend the entire length of the furnace. These castings are provided with depending flanges 35 (Fig. 14) and upstanding circular shaped extensions 36 having vertical flanges 37 which act to keep the fire clay bricks forming the hearth 27 in place. The circular shaped extensions 36 of the base castings 32 provide openings for water cooling pipes 38 for the purpose of keeping the metal parts associated with the base castings cool to prevent warping.

U-shaped members 39 are securely but detachably fastened by bolts 40 to the depending flanges 35. The U-shaped members have concave upper surfaces 41 for supporting the water cooling pipes 38. Flanges 42 are formed integrally with the U-shaped members 39. These flanges serve as upper guides for sealing members 43. Angle bars 44 are securely bolted to the inside legs of the U-shaped members 39 and furnish together with the flanges 42 slots or guideways for the sealing member 43 to slide in. The base castings 32 are supported upon and secured to steel plates 45 securely affixed to the furnace frame.

Figure 6:
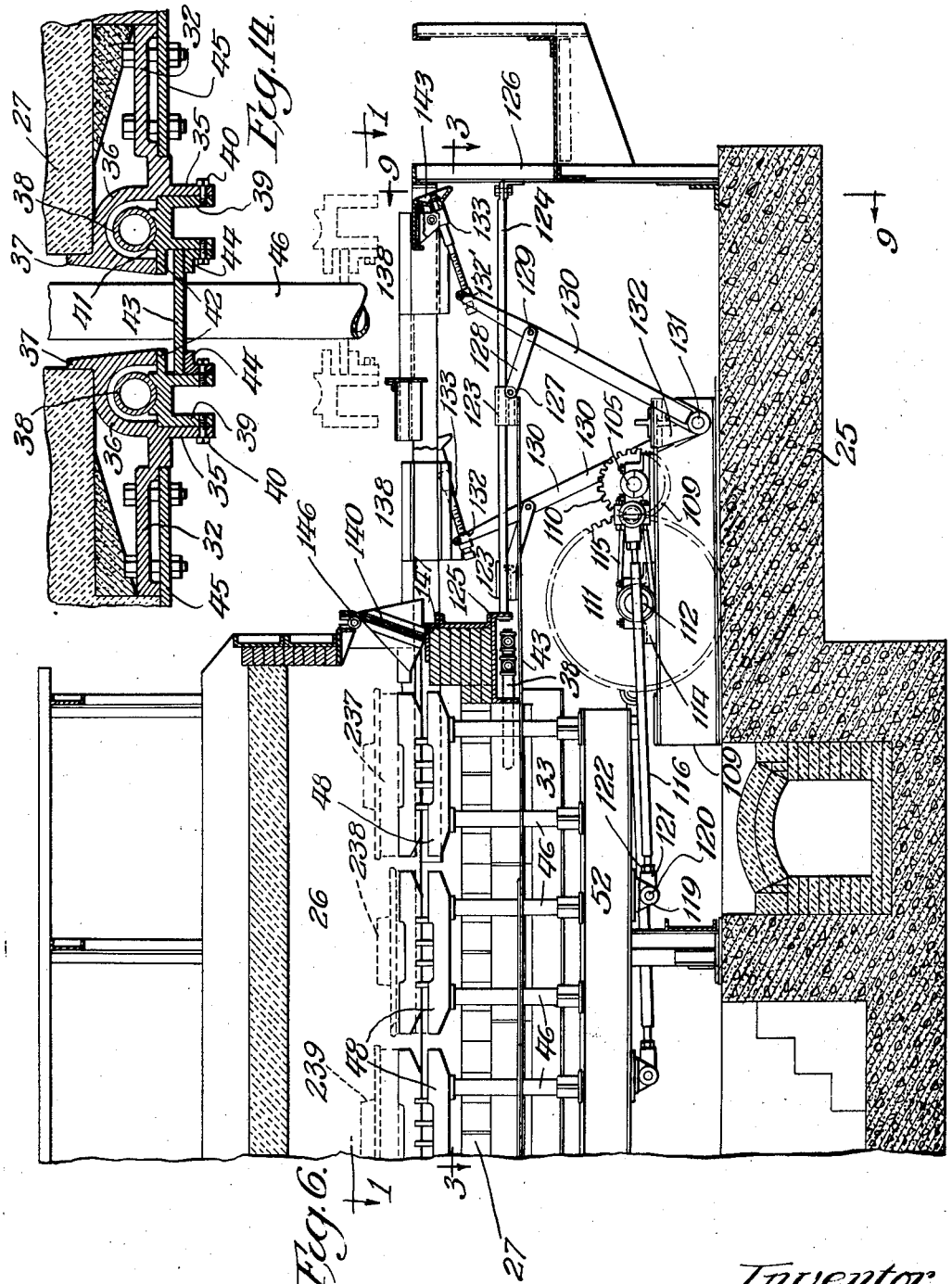
Fig. 6 is a vertical section illustrating part of the mechanism in elevation and taken along the line 6—6 of Fig. 1 looking in the direction of the arrows.
Figure 8:
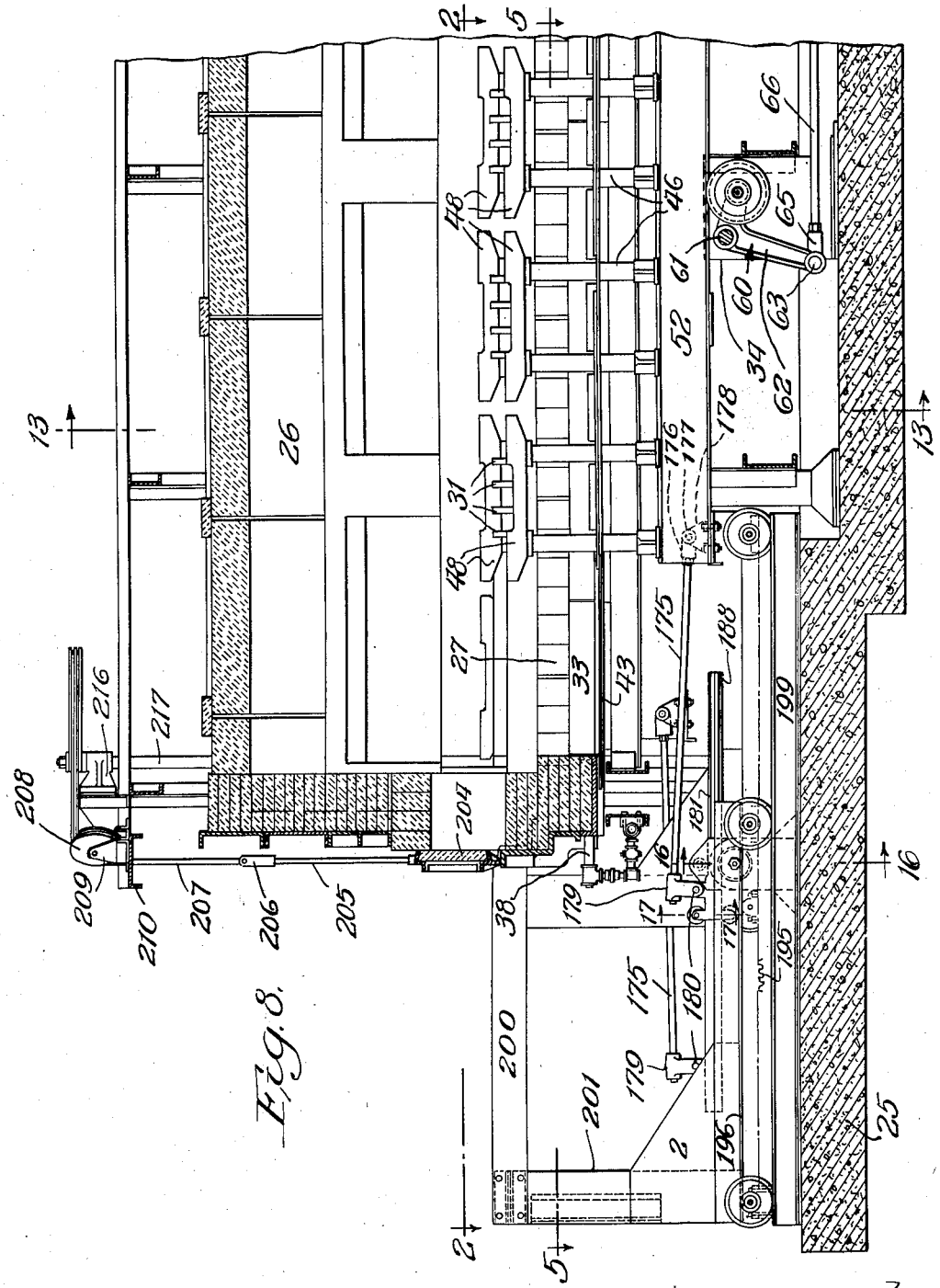
Fig. 8 is a sectional elevation of the discharge end of my improved furnace taken along the line 8—8 of Fig. 2 looking in the direction of the arrows.

The sealing members or bars 43 seal the openings 30 in the hearth and are slideable in the guideways formed as described and extend a distance outside of the furnace at both ends sufficient completely to seal the openings in the hearth at both extremes of travel of the sealing members 43 (Figs. 6 and 8). The sealing members 43 are provided with circular spaced apart openings to permit lifting bars 46 to pass therethrough (Fig. 19). The lifting bars 46 are tubular in form and support upon their upper ends cradles 48 constructed of alloy or calorized steel to withstand the heat.

Figure 7:
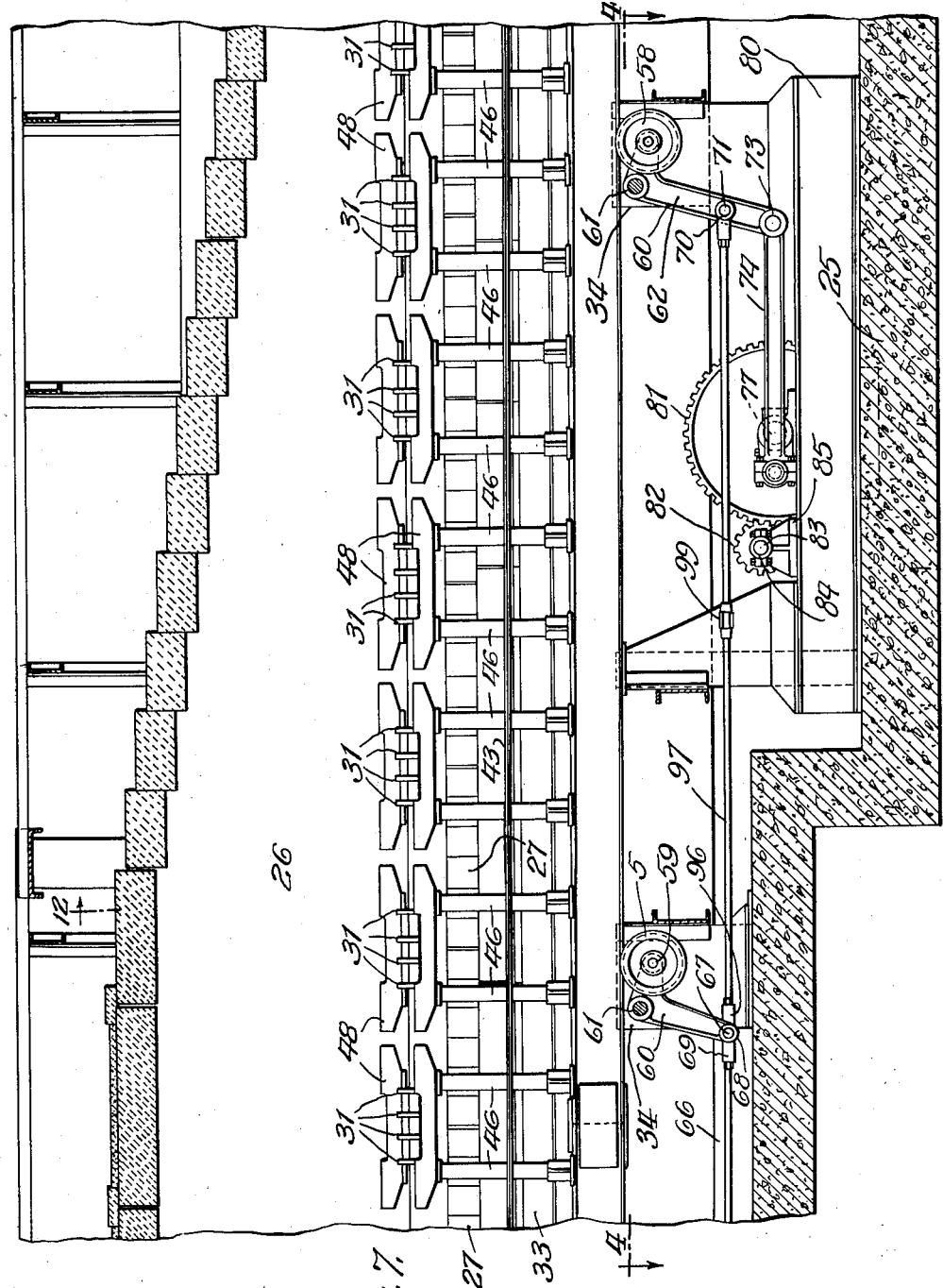
Fig. 7 is a sectional elevation of my improved furnace taken along the line 7—7 of Fig. 4 looking in the direction of the arrows.

These cradles are provided with circular flanges 49 formed integrally therewith and having openings 50 in the center thereof to permit rods or bolts 51 to penetrate the tubular lifting bars 46 to secure the cradle 48 thereto and the structure comprising the cradles 48 and lifting bars 46 to the walking beams 52 by nuts 53 through the medium of brackets 54 (Fig. 13). The brackets 54 form sockets or seats for the lifting bars 46 and are secured to the walking beams 52. Fireproof cement 55 is poured in the top of the flanges 49 to protect the bolts or rods 51 from the heat of the furnace (Fig. 19). The lifting bars 46, as before mentioned, are secured to two walking beams 52 disposed directly below the slots 30 which divide the furnace hearth into three or more sections (Figs. 12 and 13). The walking beams 52 consist essentially of two spaced apart I beams 56 united together by the brackets 54 and spacing bolts 57. The lower flanges of the I beams 56 rest upon flanged wheels 58 rotatably mounted upon axles 59 carried upon angularly-shaped supporting members 60 (Figs. 7 and 12). The supporting members 60 are pivoted upon shafts 61 firmly secured in bearings in supporting columns 34.

The endmost supporting members 60, or the ones closest to the discharge end of the furnace (Figs. 8 and 13) are connected to pull rods 66 through socket members 65 rotatably mounted upon shafts 63 connecting the depending legs 62 of the supporting members 60 together. The intermediate supporting members 60 are connected to the pull rods 66 (Figs. 4, 7 and 12) by shafts 67 rotatable in bearings 94 in the depending legs 62 of supporting members 60. A pair of pull rods 97 are connected to each of the shafts 67 by head members 96. The length of the pull rods 97 may be adjusted by the sleeve connecting nuts 99 (Fig. 7).

The pull rods 97 are connected by socket members 70 to the supporting member 60 closest the charging end of the furnace. The socket members 70 are connected to the legs 62 of the supporting members 60 adjacent the charging end of the furnace by a shaft 71 rotatable in bearings 72 (Fig. 12) in the depending legs 62 of the supporting members 60. The supporting members 60 adjacent the charging end of the furnace are connected through the shafts 73 and cross heads 98 to connecting rods 74 (Fig. 4) and thence to crank arms 75 by bearings 76. Crank arms 75 are affixed to a shaft 77 rotatable in bearings 78 formed in columns 79 mounted upon a base 80 attached to the furnace foundation 25 (Fig. 7). The shaft 77 carries a spur gear 81 suitably affixed thereto and adapted to mesh with a spur gear 82 splined to a shaft 83 rotatable in bearings 84 carried in columns 85 affixed to the base 80.

Figure 4:
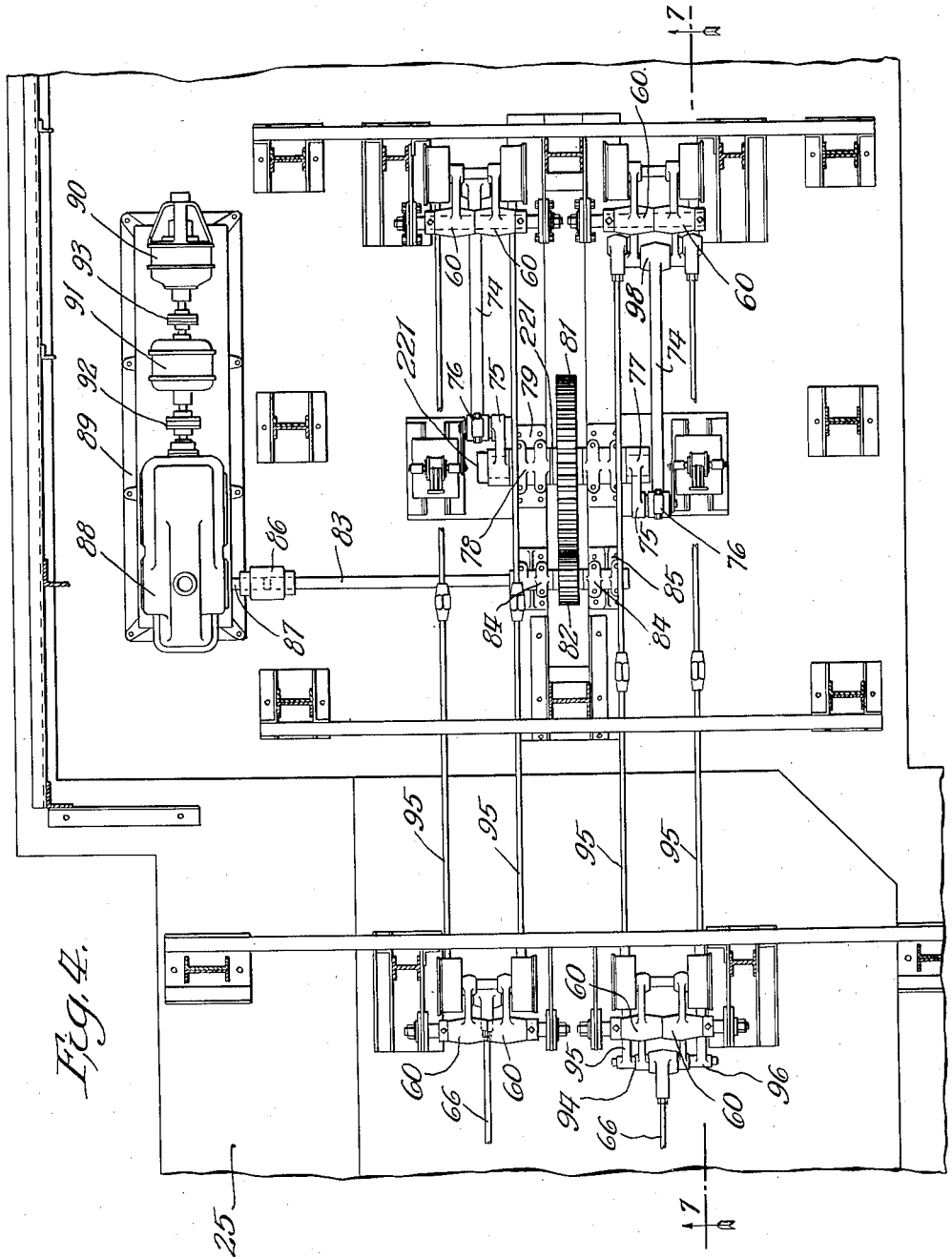
Fig. 4 is a similar section, along the line 4—4 of Fig. 7 looking in the direction of the arrows.

The shaft 83 is connected through an adjustable connecting member 86 to a stub shaft 87 of a gear speed reducer 88. The gear reduced 88 is supplied with a supporting base 89 and is driven by an electric motor 90 mounted upon the base 89 through another speed reducer 91 also mounted upon a base 89 to the coupling 92 and 93. (Fig. 4.)

The mechanism just described brings about the raising and lowering of the walking beams 52 carrying the cradles 48 supported on the lifting bars 46.

Figure 3:
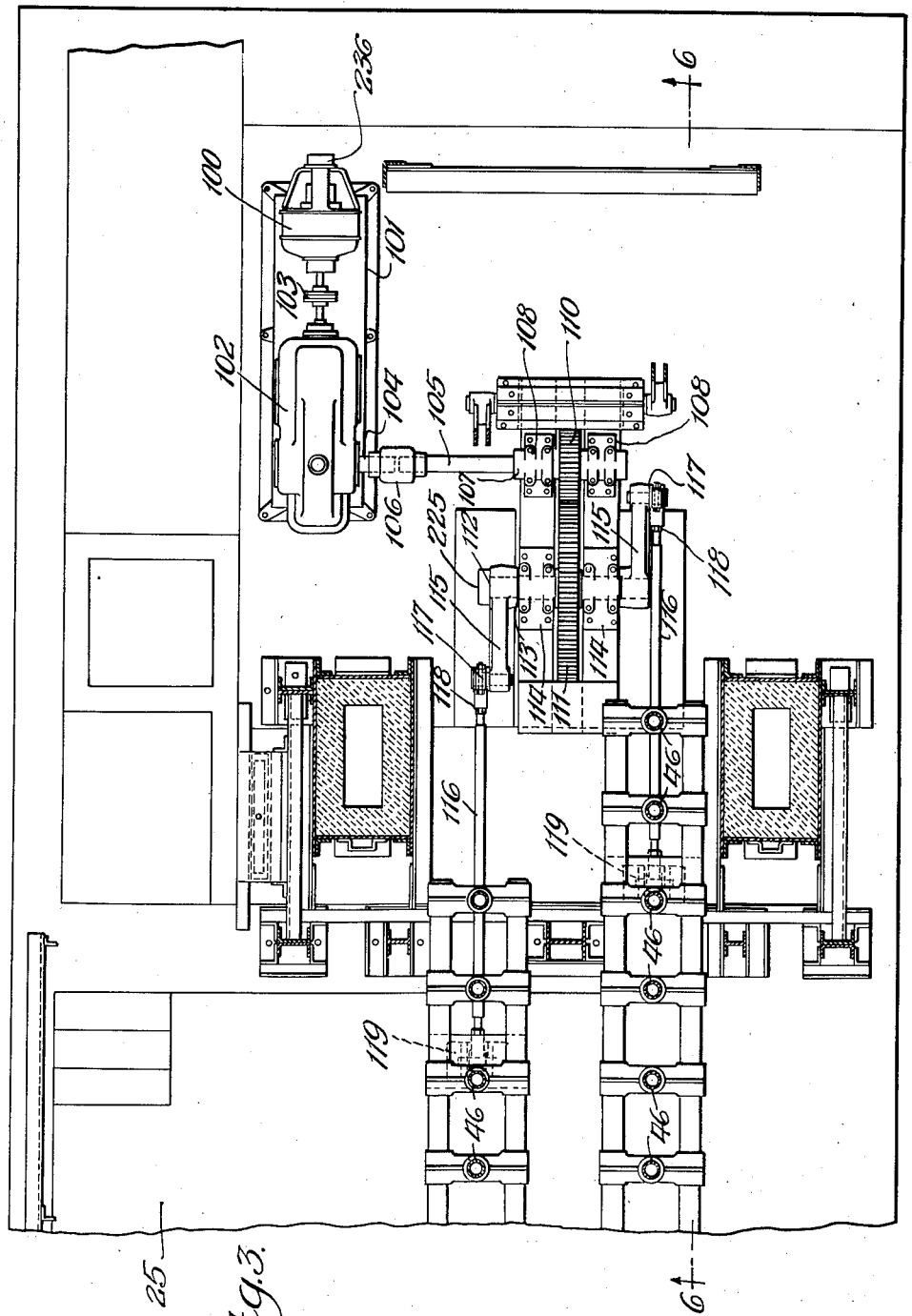
Fig. 3 is another section, taken along the line 3—3 of Fig. 6 looking in the direction of the arrows.

The walking beams 52 are moved alternately in a horizontal direction on the flanged wheels 58 carried on the supporting members 60 by an electric motor 100 mounted upon a base plate 101 supported on the foundation 25 (Fig. 3).

The shaft of the motor 100 is connected to the shaft of the speed reducer 102 through a coupling 103. The speed reducer 102 has a shaft 104 connected to a shaft 105 by an adjustable coupling member 106. The shaft 105 is rotatable in bearings 107 in brackets 108 supported on a base 109 and affixed to the foundation 25 (Fig. 6). The shaft 105 carries a spur gear 110 firmly affixed thereto, meshing with a spur gear 111 splined to a shaft 112 supported in bearings 113 in brackets 114 mounted on the base 109.

The shaft 112 is provided with two crank arms 115, one fixed to each end thereof. Each crank arm 115 is joined to a connecting rod 116 by a bearing 117, the connecting rods 116 being adjustable by nuts 118.

Each of the connecting rods 116 is connected to one of the walking beams 52 through a connecting bracket 119, a shaft 120 and a cross head 121 in which the connecting rod 116 is adjustable by the nut 122.

The mechanism just described serves to bring about the alternate horizontal movement of the walking beams 52 irrespective of their vertical position.

The mechanism for charging the furnace will now be described.

From what has gone before, it will be obvious that the sealing members 43 move horizontally in accordance with the horizontal movements of the walking beams 52. The sealing members 43 at the charging end of the furnace extend considerably beyond the end thereof and are each provided at their ends with a connecting block 123 securely fastened thereto by bolts or in any other convenient manner. The connecting blocks 123 have circular openings extending longitudinally therethrough to permit them to slide on guide shafts 124. The guide shafts 124 are supported at one end by a channel member 125 connected to the furnace and at the other end upon columns 126. Each of the connecting blocks 123 carries a shaft 127 therein to which one end of a link member 128 is connected (Fig. 22). The other ends of the link members 128 are pivotally connected as at 129 to operating members 130. The operating members 130 are rotatably supported at their lower ends upon shafts 131 in brackets 132 securely attached to the base 109. The other ends of the operating members 130 are pivotally connected at 132' to screw threaded shafts 133. Each of the shafts 133 is provided with a sleeve 134 supporting a pivoted bracket 135 in a bearing 136. Each of the brackets 135 is connected to a channel member 137 attached to the frame of the charging carriage 138. The charging carriages 138 are formed from structural shapes, bolted together and adapted to slide on skids 139 (Figs. 1, 21 and 23). The skids 139 are supported at one end adjacent doors 140 of the furnace and at the other end on the columns 126. Each charging carriage 138 is provided with a seat 141 extending on either side of the skids 139 and having an upstanding flange 142 along its rear edge. The carriages act as pushing elements as they are moved toward the furnace to push charges such as wheels or billets along the skidways 139 into the furnace. Each shaft 133 is provided with a hand wheel 143 the rotation of which brings about the sliding movement of the sleeve 134 and the positioning of the associated charging carriage 138 on the skids 139 to provide for an adjustment in accordance with the size of the charges to be passed through the furnace. An indicating member 144 is secured to each charging carriage 138 and cooperates with a stationary scale 145 suitably affixed to the skidways 139. It will be seen that movement of the hand wheels 143 brings about the movement of the charging carriage 138 toward or away from the furnace and also adjusts the amount of travel of the charging carriage 138 to provide that when charges are pushed into the furnace they will be properly positioned with respect thereto.

From the foregoing, it will be seen that the charging carriages are moved by the walking beams and serve to push charges alternately into the furnace through each of the doors 140. The doors 140 are hinged along their upper edge as at 146 to permit their swinging movement as a result of the movement of the charging carriages. The doors are mounted at an angle (Fig. 6) so that when closed their lower edges rest upon a plate 147 which completely seals the furnace. They swing into their closed position under the influence of gravity. The doors 140 are constructed with a cutaway portion 148 to permit the skids 139 to penetrate into the furnace (Fig. 11).

A damper mechanism comprising a damper 149 and an operating handle 150 is hung on a bracket 151 extending from the top of the furnace by means of a rope 152 and connecting members 153 and 154. The handle 150 is mounted upon a shaft 151 suitably connected to the damper 149. The damper 149 is adapted to control the admission of air through a flue 155 to the furnace. It will be understood, of course, that there are a plurality of these dampers throughout the length of the furnace to control the combustion.

The mechanism by which the charges such as wheels are removed from the furnace will now be described. Pusher rods 175 are connected to each of the walking beams 52 through adjustable socket members 176, bearings 177 and brackets 178. (Fig. 8.) Each pusher rod terminates in a fitting 179 rotatable on a shaft 180 carried in bearings in a rack member 181. The rack members are provided with cross heads 182 which may be formed integrally therewith (Fig. 17).

A pair of guide wheels 183 and 184 are rotatably carried on shafts 185 and 186 secured to the cross head 182 (Fig. 18). The guide wheels such as 183 and 184 are provided with a double flange forming a guideway in which guiding members 187 operate (Fig. 17). The guiding members 187 are secured adjacent to cross heads 182 of the rack members 181 to the furnace frame. The racks 181 are provided with teeth 188 along their underside meshing with pinions 189 keyed to a shaft 190 rotatable in bearings in supporting brackets 191 (Fig. 16). Flanged guide wheels 192 are rotatably mounted upon the shafts 193 secured in brackets 191 and serve to hold the racks 181 in contact with pinions 189.

Spur gears 194 of larger diameter than the pinions 189 are suitably fastened on the shafts 190 and mesh with racks 195 secured to the frames 196 of the retrievable carriages or peals. The retrieving carriages 197 consist of structural shapes 196 suitably bolted together and mounted upon flanged wheels 198 which run on tracks 199 formed by I beams secured to the foundation 25. One walking beam 52 thus brings about the movement of its corresponding retrieving carriage 197 in the direction of movement opposite to its own and for a greater distance on account of the difference in size between the pinion gears 189 and the spur gears 194.

The two retrieving carriages are thus moved alternately into and out of the furnace. The upper portions of the retrieving carriages or peals are provided with a pair of horizontal structural members 200 mounted upon vertical structural members 201 forming part of the frames of the retrieving mechanism. The horizontal structural members 200 are only connected with the frame of the retrieving carriage at its far end and project into slots 202 in the end wall of the furnace. The spacing between the horizontal members 200 of each retrieving carriage is such as to support the charge, billet or wheel passing through the furnace. The height of the horizontal members 200 is such as to fall just below the topmost position that the cradles 48 attached to the walking beams assume so that when the walking beams 52 start to assume their lowermost position, the charge, a billet or wheel, is disposed upon the horizontal members 200 of the retrieving carriage 197 and then removed from the furnace.

Door opening mechanism is provided for opening the furnace doors as the charges are removed from the furnace. Furnace doors 203 and 204 in the discharge end of the furnace are each supported or hung on rods 205 connected to adjustable brackets 206. Ropes 207 are suitably connected to the brackets 206 and lead over sheaves 208 rotatably mounted in brackets 209 supported on a cross member 210 affixed to supporting columns 211 and constituting part of the structural frame of the furnace. The ropes 207 are suitably fastened to a sector-like sheave 212 carrying two grooves in which the ropes 207 operate. The sector-like sheave is carried on a tubular supporting member 213 mounted in a socket 214 firmly secured to a shaft 215.

The shaft 215 extends downwardly to the bottom of the furnace and is rotatable in bearings carried in brackets 216. The door 203 of the furnace is suspended in a like manner and is operable through the shaft 217.

Figure 5:
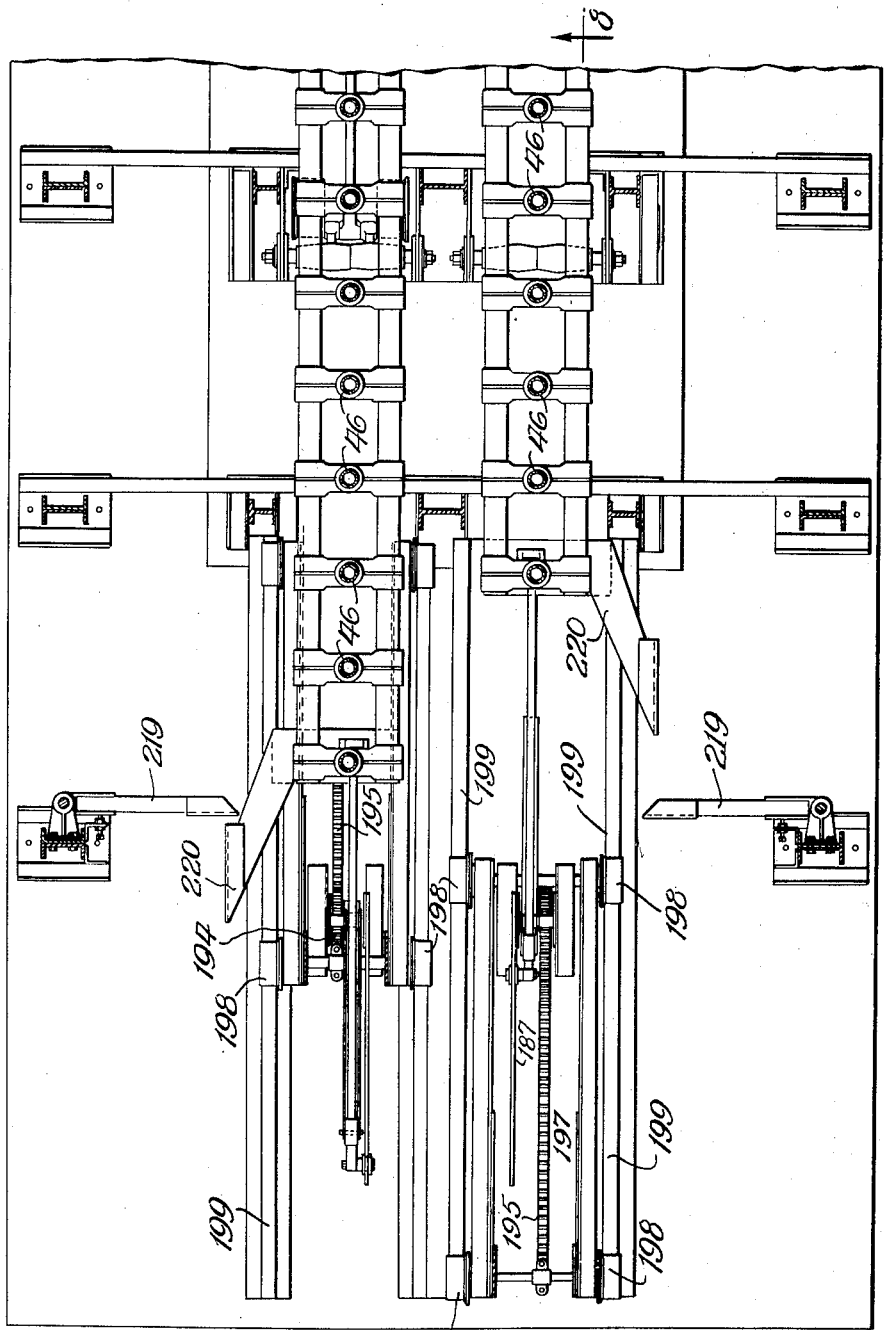
Fig. 5 is a section along the line 5—5 of Fig. 8 looking in the direction of the arrows.

From the foregoing, it will be seen that when the shafts 215 and 217 are rotated, the corresponding doors 204 and 203 will be raised. Each of the shafts 215 and 217 are provided at the lower ends with brackets 218 keyed thereto that support cam members 219 (Fig. 5). The cam members 219 are adapted to be operated by operating members 220, suitably secured to the walking beams 52, in one position of travel of the walking beams, that is, as the walking beams are being moved in a direction toward the charging end of the furnace. This is accomplished by the pushing of the cam members 219. If the walking beams are moved toward the discharge end of the furnace, the operating members 220 are raised above the cam members 219 and do not operate them. On the return movement of the walking beams 52, the operating members 220 are in position to operate the cam members 219 for the reason that at this time the walking beams 52 are lowered into such position as to bring the operating members 220 in the path of travel of the cam members 219 (Fig. 10). When this occurs, the cam members 219 are caused to rotate through an arc and thereby to bring about a partial revolution of the shafts 215 and 217 opening one or the other of the doors 204 and 203.

The motor 90 which brings about the vertical movement of the walking beams 52 operates continuously. By reason of the functioning of the speed reducers 88 and 91, the shaft 83 is rotated very slowly and the shaft 77 turns still more slowly. The shaft 77 directly controls the up and down movement of the walking beams through the connecting rods 74. A cam operated limit switch 221 is associated with the shaft 77. The limit switch 221 is provided with a cam 222 and contacts 223 and 224 (Fig. 24). The contacts are adapted to be opened and closed by the cam 222 in any usual and well known manner. The cam 222 is cut so that the contact 223 is closed and opened before the contact 224 is closed. It will be seen that during one revolution of the cam 222 as controlled by the shaft 77, the contacts 223 and 224 will be opened and closed. A second limit switch 225 is adapted to be operated by the crank shaft 112. The limit switch 225 is provided with a pair of contacts 226 and 227 that are adapted to be operated by a cam 228. The limit switches 221 and 225 (Fig. 24) may be of any usual or well known construction. The manner in which the cam switches 221 and 225 must operate will appear more fully from a description of the operation of my improved furnace which follows:

Before starting to describe the general operation of the furnace, reference must be had to Fig. 24 wherein the schematic circuits and apparatus for controlling the motor 100 are generally shown. The motor 100 brings about the horizontal movement of the walking beams 52, or, in other words, the progress of the charges through the furnace and is intermittently operated by the functioning of the cam switches 221 and 225 through the operation of an intermediate contactor 229. The contactor 229 is provided with a contact making member 230 and a pair of contact members 231 and 232. Energy from suitable source of supply of the proper voltage is connected to the contactor 229. The contactor 229 controls the operation or circuit of the motor 100. The motor 100 is supplied with energy from a suitable source 233. While direct current for supplying the motors has been illustrated in Fig. 4, it is obvious that alternating current may be employed.

The operation of the furnace will now be described.

The charges such as car wheels or billets are deposited at proper intervals of time on the skids 139 (Fig. 1) as at 234 outside of the furnace. The hand wheels 143 are adjusted so that the charging carriers 138 are properly spaced on the skids 139 for the size of the charges. The motor 90 is operating continuously to bring about the alternate vertical movement of the walking beams 52 carrying the cradles 48. The rotation of the motor 90 drives the shaft 83 through the speed reducers 91 and 88 and thence the crank shafts 75 through the spur gears 82 and 81. The crank shafts 75 bring about the pivotal movement of the supporting members 60 through the connecting pushing rods 66 and 95 to raise and lower the walking beams 52 alternately carrying the cradles 48 on the tubular supporting members 46. The cam switch 221 is operated by the motor 90 and serves to close the contacts 223 when one walking beam is at its highest position and the contacts 224 when the other walking beam 52 is at its highest position. The cam switch 225 associated with the motor 100 is adapted to close the contacts 226 when one walking beam is in an extended position and the contacts 227 when the other walking beam 52 is in an extended position. When the cam switch 221 closes the contacts 223, the contacts 226 of the cam switch 225 are closed by the former operation of the motor 100 and there is a circuit completed for the contactor 229. The contactor 229 operates to close the circuit of the motor 100. The motor 100 operates to drive the shaft 105 through the speed reducer 102 thereby bringing about the rotation of the spur gear 111 through the spur gear 110. The crank arms 115 are thereby rotated to bring about the alternate horizontal movement of the walking beams 52 on the flanged wheels 58. The movement of the walking beams 52 causes the sliding movement of the sealing members 43 and the consequent movement of the charging carriages 138. The operation of the charging carriages 138 serve to push the charges along the skids 139 through the doors 140 and the skids 139 in the furnace, into the position indicated at 235 (Fig. 1). At this time the walking beam associated with the charging carriage 138 moved the charge into he furnace. Just before the end of the horizontal movement of the charging carriage or just before the end of a half revolution of the shaft 112, the contacts 227 are closed and the contacts 226 are opened. The opening of the contact 226 opens the circuit of the motor 100 and the horizontal movements of the walking beams cease momentarily. By the continued rotation of the motor 90, the contacts 223 are then opened and the contacts 224 are closed on the cam switch 221. By the closure of the contacts 224 there is another circuit completed for the contactor 229. The contactor 229 is operated again to close the circuit of the motor 100 again bringing about the horizontal movements of the walking beams. The contacts 226 of the cam switch 225 are closed toward the end of the next half revolution of the shaft 112 to prepare another circuit for the contactor 229. The contacts 227 are then opened at the end of a half revolution of the shaft 112 to open the circuit of the contactor 229 thereby opening the circuit of the motor 100 and again interrupting the horizontal movements of the walking beams 52. A magnetic brake 236 (Fig. 3) may be associated with the motor 100 to stop its rotation when its circuit is opened in any well known manner. When the walking beam 52 on the side at which the wheel is deposited in position 235, the walking beam will be in its lowermost position so that the cradle 48 at this point comes below the wheel being charged. As the walking beam 52 raises the wheel is raised from its position on the skids 139 into the dotted position at 237. Upon subsequent horizontal movement of the walking beams 52, the wheel is moved into the dotted position 238 and then deposited on the hearth and remains there until lifted by the next cradle of the walking beam as at 239. Thus, the wheels or charges are moved into the furnace, the doors 140 being opened momentarily to admit them and gradually moved through the furnace by the walking beams 52.

The wheels or charges are removed from the furnace by the action of the peals or retrieving carriages 197. It will be remembered that as each walking beam approaches the discharge end of the furnace, the associated retrieving carriage 197 is moved into the furnace on the wheels 198 so that when the associated walking beam moves toward its lowermost position the charge is deposited upon the members 200 of the retrieving carriage. Then, as the walking beam 52 begins its movement toward the charging end of the furnace, the associated retrieving carriage begins its movement through the discharge door 204. By the operation of the cam 219 and operating member 220, the associated shaft 215 is rotated to bring about the opening of the associated door 203 or 204 permitting the charge to move out of the furnace on the retrieving carriage 197. As the charges pass through the doors, the doors 203 or 204 are again lowered to their closed position thereby sealing the furnace.

From the foregoing, it will be seen that the charges are moved slowly through the furnace by the functioning of the two walking beams 52, one walking beam 52 advancing its charges through the furnace while the other walking beam assumes a position preparatory to advancing the charges associated with it through the furnace. This result is accomplished while the hearth remains sealed by the functioning of the sealing members 43 which slide longitudinally of the furnace. The doors 140 at the charging end of the furnace are momentarily alternately opened to admit the charges and are then closed to seal the charging end of the furnace. At the discharge end of the furnace, the doors 203 and 204 are momentarily opened in the manner described at the proper intervals to permit the discharge of the charges. These provisions prevent cold air from being admitted to the furnace except through the charging and discharge doors and then only momentarily when necessary to place the charges in the furnace or remove them therefrom. This feature maintains the furnace atmosphere at the proper temperature and permits easy control thereof by the flue control provisions.

It is, of course, obvious that the length of time that the charges are passing through the furnace may be regulated by the length of the furnace and by the speed of operation of the motors 90 and 100, as well as their associated speed reducers.

Attention is also directed to the manner of constructing the hearth seal involving the sealing plate 43 as may be seen in Fig. 14. By this construction, ready access may be obtained to the hearth and water cooling pipes. That is, by removing the bolts 40 associated with the channel members 32 the sealing plate may be dropped to the position shown by the dotted lines in this figure to permit access to the cooling pipes 38. By removing the bolts 40 associated with the U shaped member 39 the sealing plate 43 itself may be dropped to permit access to the hearth at any desired point so that the same may be repaired or cleaned.

Attention is also directed to the fact that the walking beams 52 in their two movements are entirely controlled by electric motors in a positive and simple manner. The mechanism for moving the walking beams is readily accessible for repair and adjustment.

In the same manner, the mechanism operating the charging carriages 138 is simple and accessible. It should be noted that the retrieving carriages or peals 197 have a greater amount of movement and in a direction opposite to the direction of movement of the associated walking beam. The mechanism by which the walking beam controls the functioning of the retrieving carriages and the opening of the doors is also simple and efficient, as well as being readily accessible for repairs and adjustment. The water cooling pipes 38 are associated with the sealing mechanism for the purpose of preventing their warping and eliminating any tendency to bind in the guideways which might occur from the heat of the hearth.

It is, of course, obvious that a plurality of combustion chambers are provided throughout the length of the furnace and proper temperature conditions are maintained in the furnace by regulating the amount of fuel and draft to the burners in the combustion chambers. Consequently, the temperature for treating the charges can be varied and zoned as desired. This result can be accomplished with a high degree of accuracy for the reason that the furnace is maintained sealed and the furnace atmosphere constant by the sealing mechanism and provisions hereinbefore described.

While I have illustrated and described a certain specific embodiment of my invention, I am aware that many changes, modifications and departures may be made therefrom without departing from the spirit and scope thereof, as indicated in the appended claims.

I claim:

1. In a continuous heating furnace, the combination with a walking beam, mechanism for imparting both a horizontal and vertical movement to said walking beam, a charging carriage and means controlled by said beam for moving said carriage.

2. In a continuous heating furnace, a hearth having longitudinal slots therein, sliding plates for sealing said slots, said plates having openings therein and lifting rods penetrating said openings.

3. In a continuous heating furnace, a hearth having longitudinal slots therein, sliding plates for sealing said slots, said plates having openings therein and lifting rods penetrating said openings, and mechanism for raising said lifting rods.

4. In a continuous heating furnace, a hearth having longitudinal slots therein, sliding plates for sealing said slots, said plates having openings therein and lifting rods penetrating said openings, and mechanism for raising said lifting rods, and means for moving said sliding plates longitudinally of said furnace.

5. In a continuous heating furnace, a hearth made up of a plurality of sections with openings between the sections, a sliding plate adapted to seal and slide within said openings and means for cooling said plates.

6. In a continuous heating furnace, a hearth having a pair of spaced apart sections, a sealing member mounted for sliding movement longitudinally of the furnace between said sections, said sealing member having a plurality of openings therethrough, lifting bars adapted to penetrate said openings and means for actuating said lifting bars in a vertical and horizontal direction.

7. In a continuous heating furnace, a discharge door for said furnace; mechanism for advancing charges therethrough, means for operating said mechanism and a retrieving mechanism for removing charges therefrom through said door and means controlled by the advancing mechanism for operating the retrieving mechanism.

8. In a continuous heating furnace, a charging door; mechanism for placing charges in said furnace through said door, mechanism for advancing charges therethrough, means for operating said second mechanism and means controlled by the advancing mechanism for operating the charging mechanism.

9. In a continuous heating furnace, mechanism for advancing charges therethrough, means for operating said mechanism; retrieving mechanism for removing charges therefrom, said advancing mechanism having a fixed path of travel, said retrieving mechanism having a greater path of travel and connections between the advancing mechanism and the retrieving mechanism for operating the same.

10. In a continuous heating furnace, a door at the discharge end of the furnace, means for operating said advancing mechanism; mechanism for advancing charges through said furnace, retrieving mechanism for obtaining charges from said furnace, connections between said charging and retrieving mechanism for bringing about the operation of the latter and means controlled by the advancing mechanism for opening said door to permit said retrieving mechanism to withdraw charges therethrough.

11. In a continuous heating furnace, a hearth divided into two sections with a space therebetween, a sealing plate mounted for sliding movement in said opening said sealing member having a plurality of spaced apart openings therein, lifting bars adapted to penetrate said openings, mechanism for moving said bars in a vertical direction to raise the metal being heated from the hearth, means for moving said material in a horizontal direction to a new position on the hearth and means for lowering said lifting bars to deposit said material on said hearth.

12. In a continuous heating furnace, the combination of a sectional hearth having spaced apart openings between the sections, sealing members mounted for sliding movement in said spaces, mechanism for moving charges along said hearth from the opening to the discharge end of said furnace, a pair of doors at the charging end of said furnace, mechanism for placing charges in said furnace alternately through said doors.

13. In a continuous heating furnace, a hearth having a pair of spaced apart longitudinal openings therein, a sealing member mounted for sliding movement in each of said openings, a walking beam mounted below each sealing member, a plurality of spaced apart openings in each sealing member, lifting bars penetrating said openings mounted upon said beams, and mechanism for moving said walking beams in a vertical and horizontal direction.

14. In a continuous heating furnace, a hearth having a pair of spaced apart longitudinal openings therein, a sealing member mounted for sliding movement in each of said openings, a walking beam mounted below each sealing member, a plurality of spaced apart openings in each sealing member, lifting bars penetrating said openings mounted upon said beams, mechanism for moving one walking beam in a horizontal direction toward one end of the furnace and the other walking beam in a horizontal direction toward the other end of the furnace.

15. In a continuous heating furnace, a hearth having a pair of spaced apart longitudinal openings therein, a sealing member mounted for sliding movement in each of said openings, a walking beam mounted below each sealing member, a plurality of spaced apart openings in each sealing member, lifting bars penetrating said openings mounted upon said beams, mechanism for lifting one walking beam and simultaneously lowering the other.

16. In a furnace, a hearth constructed of refractory clay having a plurality of spaced apart flat metal plates embedded in said hearth so that their edges project about the surface thereof.

17. In a continuous heat treating furnace, a hearth composed of a pair of spaced apart sections, a pair of water cooling pipes below each section of said hearth, adjacent said opening, supporting members for said pipes forming a guideway detachably secured to each section of said hearth and a sealing member mounted for sliding movement in said guideway.

18. In a continuous heating furnace, a hearth composed of a pair of spaced apart sections, a beam mounted for movement below and between said sections, a plurality of lifting bars attached to said beam, a cradle having openings therein forming a seat for said lifting bars, a bolt connecting said cradle to said lifting bars and means for protecting the head of said bolt from the heat of said furnace.

19. In a continuous heating furnace, a charging carriage, mechanism for advancing charges through said furnace, means for operating said mechanism a connection between said advancing mechanism and said charging carriage for bringing about the operation of the latter and means for adjusting said connection.

20. In a continuous heating furnace, a hearth having a pair of spaced apart sections, a sealing plate mounted for sliding movement longitudinally of the hearth between the sections, means for reciprocating and sealing plate; a charging carriage and a connection from said charging carriage to said sealing plate.

21. In a continuous heating furnace, a hearth having a pair of spaced apart sections, a sealing plate mounted for sliding movement longitudinally of the hearth between the sections, means for reciprocating said sealing plate a charging carriage, connections from said charging carriage to said sealing plate, and means for moving said sealing plate longitudinally of said hearth.

22. In a continuous heating furnace, a hearth divided into a pair of sections, a walking beam mounted between and below said sections, flanged wheels supporting said walking beam, pivoted brackets supporting said wheels, connections between said brackets, an electric motor and mechanism including said motor to bring about the swinging movement of said brackets on said pivots, a second electric motor and connections between said motor and said beam for bringing about its movement on said wheels longitudinally on said hearth.

23. In a continuous heating furnace, a hearth having slots extending substantially the whole length thereof therein, a beam mounted for longitudinal movement below each slot, a retrieving carriage for retrieving charges from said furnace, a rack connected to said walking beam, a pinion meshing with said rack, a rack carried by said carriage, means controlled by said pinion for operating the carriage rack to move said carriage and means for moving said beam longitudinally of said hearth.

24. In a continuous hearth furnace, advancing mechanism for moving charges through said furnace, a pair of retrieving carriages adjacent the discharge end of said furnace to remove charges therefrom, and connections between said advancing mechanism and said retrieving carriages to bring about their alternate operation into the furnace to retrieve charges therefrom.

25. In a continuous heating furnace, a hearth divided into a pair of sections, a walking beam mounted for movement below and for moving the charges along the hearth, raising means for raising said beam, advancing means for advancing said beam, a continuously operating electric motor for operating said raising means, a second electric motor for operating said advancing means and means controlled by the first motor for operating the second motor.

ARTHUR L. STEVENS.